US012456374B2

(12) United States Patent
Martin et al.

(10) Patent No.: US 12,456,374 B2
(45) Date of Patent: Oct. 28, 2025

(54) VEHICLE MONITORING SYSTEM FOR PARKING FACILITY (71) Applicant: Municipal Parking Services, Inc., Minnetonka, MN (US)

(72) Inventors: James Paul Martin, Minneapolis, MN (US); Mark J. Moran, Austin, TX (US)

(73) Assignee: Municipal Parking Services, Inc., Golden Valley, MN (US)

( * ) Notice: Subject to any disclaimer, the term of this patent is extended or adjusted under 35 U.S.C. 154(b) by 39 days.

(21) Appl. No.: 18/654,310

(22) Filed: May 3, 2024

(65) Prior Publication Data

US 2024/0371270 A1 Nov. 7, 2024

Related U.S. Application Data (60) Provisional application No. 63/463,878, filed on May 3, 2023.

(51) Int. Cl.
*G06V 20/52* (2022.01)
*G06V 20/62* (2022.01)
*G08G 1/14* (2006.01)

(52) U.S. Cl.
CPC ........... *G08G 1/148* (2013.01); *G06V 20/52* (2022.01); *G06V 20/625* (2022.01); *G08G 1/146* (2013.01); *G06V 2201/08* (2022.01)

(58) Field of Classification Search
None
See application file for complete search history.

(56) References Cited

U.S. PATENT DOCUMENTS

| | | | |
|---|---|---|---|
| 9,870,648 B2 | 1/2018 | Moran et al. | |
| 10,121,172 B2 | 11/2018 | Hudson et al. | |
| 2014/0036077 A1* | 2/2014 | Nerayoff | G06V 20/62 348/148 |
| 2014/0214500 A1* | 7/2014 | Hudson | G07B 15/02 705/13 |
| 2017/0032583 A1* | 2/2017 | Moran | G08G 1/065 |
| 2018/0096263 A1* | 4/2018 | Modi | G07B 15/00 |
| 2020/0211071 A1* | 7/2020 | Rosas-Maxemin | G06Q 30/0284 |

OTHER PUBLICATIONS

The International Search Report and Written Opinion rendered by the International Searching Authority for PCT/US24/27638, dated Aug. 14, 2024, 9 pages.

* cited by examiner

*Primary Examiner* — John F Mortell
(74) *Attorney, Agent, or Firm* — Skaar Ulbrich Macari, P.A.

(57) ABSTRACT

A parking facility that includes two or more parking areas/levels/sublots that are subject to different parking rules and/or cost structures employs cameras to monitor exit events for each separate parking area/level/sublot that is subject to different parking rules and/or cost structures. Vehicle parking is monitored for each different parking area by reading a vehicle characteristic with a camera, such as a license plate reading (LPR) camera where plates of vehicles exiting each sublot can be read. As the vehicle is determined to be exiting a first sublot, it is removed from the tally for that first sublot and simultaneously added to the tally for the second sublot. Additional sublots are monitored and tallied in a similar manner.

20 Claims, 8 Drawing Sheets

VEHICLE MONITORING SYSTEM FOR PARKING FACILITY

PRIORITY

This Application claims priority to and the benefit of U.S. Provisional Patent Application No. 63/463,878, filed Mar. 3, 2023, which is incorporated fully herein by reference.

FIELD

The present invention relates to devices, methods and systems for monitoring parking in a parking facility, and more particularly, to devices, methods and systems for monitoring vehicle movement within a parking facility.

BACKGROUND

Automated parking management systems for parking lots and ramps are disclosed, for example, in U.S. Pat. No. 10,121,172 B2, which is incorporated herein by reference in its entirety. Such systems utilize license plate recognition (LPR) cameras to identify vehicles entering and exiting the parking facility.

In order to establish a "parking session," the vehicle's plate is "read" by a camera utilizing LPR upon the vehicle's entrance to the parking facility. This allows the parking management system to add to the occupancy tally of vehicles in the facility and to time the vehicle's occupancy in the facility for accurate charging of parking time. The parking session ends when the vehicle's plate is again read by a camera at the exit of the facility using LPR. This allows the parking management system to subtract the vehicle from the occupancy tally of vehicles in the facility and to calculate the charging for parking time spent in the parking facility.

Some parking structures have multiple different levels or multiple different lots/sub-lots or parking areas that are each subject to different parking rules. For example, in a multi-level parking ramp one or more of the floors may be reserved for residents or monthly permit holders, while the remaining floors are designated for open or general parking. It is problematic if non-permit holders park in spaces on floors designated for permit holders because there may not be enough remaining spaces to accommodate all of the permit holders. Likewise, if permit holders park on floors designated for open parking, then the number of spaces available for non-permit holders is undesirably reduced. Conventional entrance/exit monitoring systems cannot monitor the parking locations of the vehicles within the parking facility. Adding attendant stations, gates and/or additional entrance and exit cameras to each level or lot within the facility is extremely expensive and complex. Therefore, there is a need for improved parking facility management systems, devices and methods that address some or all of the drawbacks of conventional parking facility management systems.

SUMMARY

This invention is directed to parking facilities, such as lots, ramps, garages and streets where there are two or more parking areas, levels and/or sublots that are subject to different parking rules and/or cost structures. Vehicle parking is monitored for each different parking area by reading a vehicle characteristic with a camera, such as a license plate reading (LPR) camera where plates of vehicles exiting each sublot can be read. Other characteristics of the vehicle besides their license plate could be utilized (such as make, model, color, size and/or year) to establish the "parking session" or event of entry and exit described within this application.

As the vehicle is read exiting a first sublot, it is removed from the tally for that first area and simultaneously added (and treated as an entry) to the tally for the second area. Additional parking areas ($3^{rd}$, $4^{th}$, etc.) are monitored and tallied in a similar manner. Upon the vehicle exiting this second parking area and re-entering the first area the tally for the second parking area is reduced and the tally for the first area is increased. If the vehicle then parks in the first area the occupancy remains as is until that vehicle ultimately exits the first area.

In one example herein, an automated parking system is provided for a parking facility comprising a first sublot, a second sublot, an entrance and an exit. A first camera is disposed adjacent to the entrance of the parking facility. A second camera is disposed adjacent to the exit of the parking facility. A third camera is disposed in the parking facility such that the third camera can image vehicles exiting the first sublot and entering the second sublot. A central computer located remote from the parking facility (or local to or onsite) is networked with the first camera, the second camera and the third camera. The first camera is configured to image a vehicle identification characteristic of a vehicle entering the parking facility and transmit the vehicle identification characteristic to the central computer. The second camera is configured to image the vehicle identification characteristic of the vehicle exiting the parking facility and transmit the vehicle identification characteristic to the central computer. The third camera is configured to image the vehicle identification characteristic of the vehicle exiting the first sublot and entering the second sublot and transmit the vehicle identification characteristic to the central computer.

A fourth camera can be disposed in the parking facility such that the fourth camera can image vehicles exiting the second sublot and entering the first sublot. The fourth camera can be configured to image the vehicle identification characteristic of the vehicle exiting the second sublot and entering the first sublot and transmit the vehicle identification characteristic to the central computer.

The central control computer can be configured to determine an identification of the vehicle from the vehicle identification characteristic. The vehicle identification characteristic can be one or more license plate characters. The vehicle identification characteristic can also be at least one of a vehicle type, a vehicle make, a vehicle model, a vehicle year and a vehicle color.

A combination of one or more vehicle characteristics can also be employed. There can also be a primary vehicle identification characteristic and a secondary vehicle identification characteristic, wherein the secondary vehicle identification characteristic is used as a verification of identification determined based upon the primary vehicle identification characteristic.

The central computer can comprise a parking permit database to store vehicle identifications for vehicles with permits for parking in the parking facility. Time stamps for each camera's identification can also be stored in a database by the central computer. The central computer is configured to compare the vehicle identification of the vehicle exiting the first sublot and entering the second sublot to the stored vehicle identifications in the parking permit database to determine whether there is a match.

The second sublot can be reserved for parking permit holders. If the vehicle exiting the first sublot and entering the second sublot dwells for more than a preset period of time in the second sublot, and wherein when the central computer determines that there is no match of the vehicle identification of the vehicle entering the parking facility to the stored vehicle identifications in the parking permit database, the central computer is further configured to issue a parking violation notice to said vehicle. Alternatively, the first sublot can be designated as the parking permit lot, in which case the dwell time of the vehicle in the first sublot would be evaluated until the vehicle exits the first sublot and enters the second sublot.

In a sublot reserved for parking permit holders, the central computer can determine whether there is a match of the vehicle identification of the vehicle in that sublot to the stored vehicle identifications in the parking permit database. If there is a match, then the central computer does not calculate an hourly charge for parking by the vehicle.

Each of the first camera, second camera and third camera can be license plate reading (LPR) cameras.

A parking rule for the first sublot can be different than for the second sublot. A parking price for the first sublot can be different than for the second sublot. The first sublot can be reserved for permit holders and the second sublot be open for hourly parking, or vice-versa.

In another example herein a method of automatically monitoring of a vehicle in a parking facility comprising a first sublot and a second sublot is provided. A vehicle identification is captured with a first lot camera as the vehicle exits the first sublot and enters the second sublot. The vehicle identification captured by the first lot camera is stored in a database of a central computer system that is located remote from the parking facility (or local or onsite). A vehicle identification is captured with a second lot camera as the vehicle exits the second sublot and enters the first sublot. The vehicle identification captured by the second lot camera is stored in a database of the central computer system.

A vehicle identification can be captured with an entrance camera as the vehicle passes through an entrance to the parking facility. A vehicle identification can be captured with an exit camera as the vehicle passes through an exit to the parking facility.

A grace period can be timed beginning when the vehicle exits the first sublot and enters the second sublot, or vice versa.

Different parking rules and/or prices can be applied to a vehicle in the second sublot compared to the first sublot.

The central computer can determine whether the vehicle exiting the first sublot and entering the second sublot is listed in a database of permit holders, or vice versa.

One of the first or second sublots can be reserved for parking permit holders. The central computer system can automatically issue a violation notice to a vehicle when the vehicle remains in the sublot reserved for permit holders for more than a predetermined period of time.

The vehicle identification capture includes performing a license plate reading of a license plate of the vehicle and/or determining one or more other vehicle characteristics, such as make, model, color, size, year, etc.

The above summary is not intended to limit the scope of the invention, or to describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The various features or aspects discussed herein can also be combined in additional combinations and embodiments, whether or not explicitly discussed herein, without departing from the scope of the invention.

Figure 1:
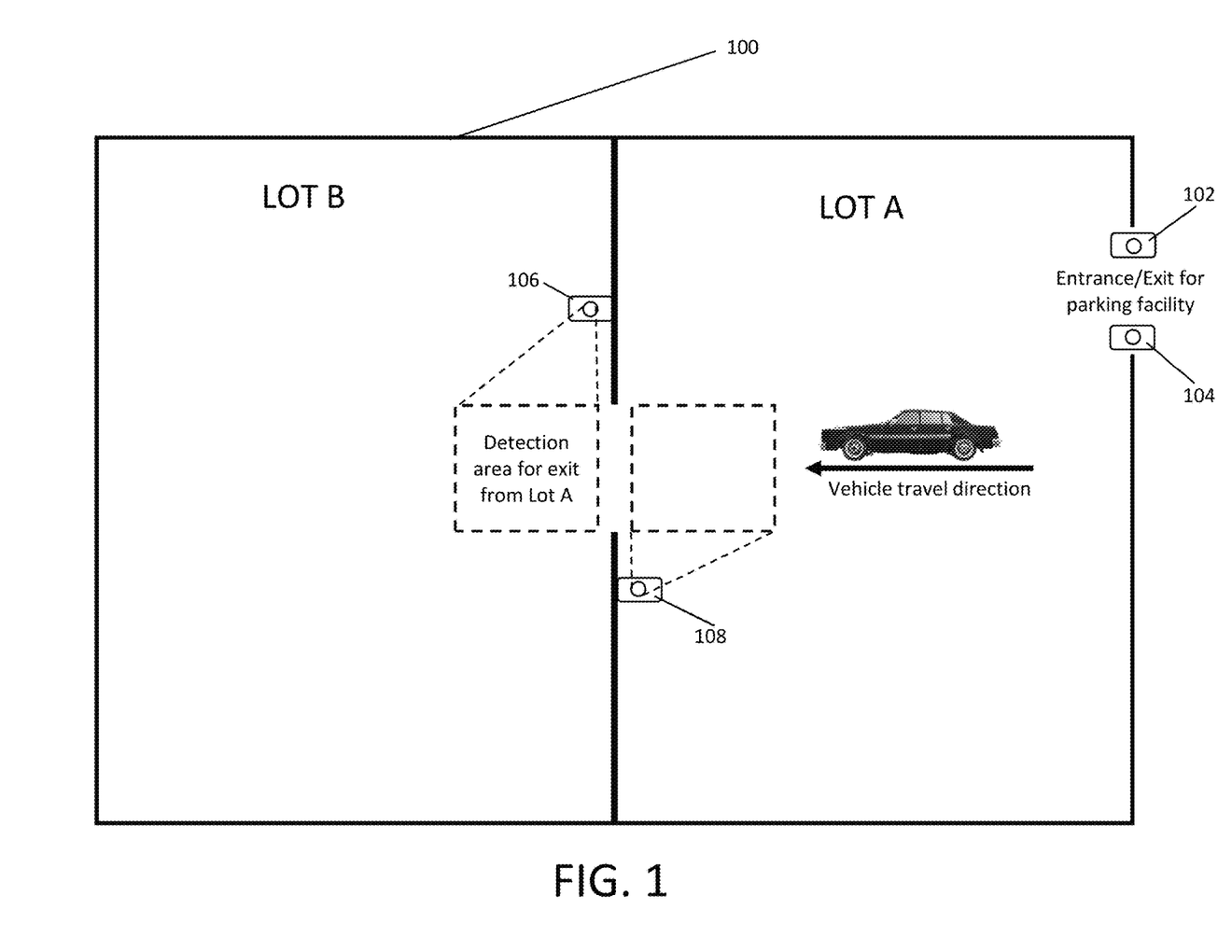
FIG. 1 is a plan view diagram of a parking facility according to certain embodiments of the invention.

Referring to FIG. 1, there is illustrated a parking facility 100. The parking facility 100 is a parking ramp, parking garage, open parking lot, street segment, or other defined area where all vehicle traffic entering and leaving the facility can be monitored. There may be more than one entrance/exit, and entrance/exit cameras are located at each such entrance and exit location. However, for sake of simplicity, the parking facility in FIG. 1 only depicts a single point of entrance and exit.

The parking facility 100 comprises two different parking areas, designated as LOT A and LOT B. Each of LOT A and LOT B represent parking areas with different parking rules. For example, LOT A and LOT B could be two different parking levels (or two different series of levels) in a parking ramp, or they could be two adjacent lots in a parking facility, or they could be different sub-lots in a given lot (e.g., nested lots), or some other similar arrangement where a user could potentially park in either location A or B, which are subject to separate parking rules.

The different parking rules may be a pricing structure, permit vs. open status, vehicle size or potentially any other differentiating characteristic that can be implemented as a rule. For sake of simplicity, the present disclosure will be explained using a permit holder vs. open parking scenario since that is a common scenario for parking facilities.

The parking facility 100 employs an entrance camera 102 and an exit camera 104 to monitor vehicles entering and exiting the parking facility 100. The entrance and exit locations can be physically remote from one another, but there would still be a corresponding camera 102 or 104 at each location.

In FIG. 1, the parking facility 100 also shows a passage 105 for a vehicle to pass from LOT A into LOT B. In other words, vehicles entering the parking facility 100 must drive through LOT A to get to LOT B. Likewise, if there was a LOT C, then the vehicle would travel through LOT A and possibly LOT B in order to get to LOT C. It should be understood that the passageway from LOT A to LOT B can be in any form. For example, the passageway could be a ramp, a road, an opening, or even a visual demarcation such as a paint line or signage.

In order for a parking monitoring system for the parking facility 100 to ascertain which lot the vehicle parks in, an additional LPR camera is located at the exit of each lot. In FIG. 1, camera 106 reads the license plates of a vehicle exiting LOT A and entering LOT B. In this scenario, the vehicle's location status is noted as LOT A when first entering the parking facility 100. Then, when that same vehicle is read by camera 106, the vehicle's location status is updated to LOT B. This process is replicated for any subsequent lot that has different parking rules that would be applied to vehicles in that lot versus a preceding lot.

Figure 2:
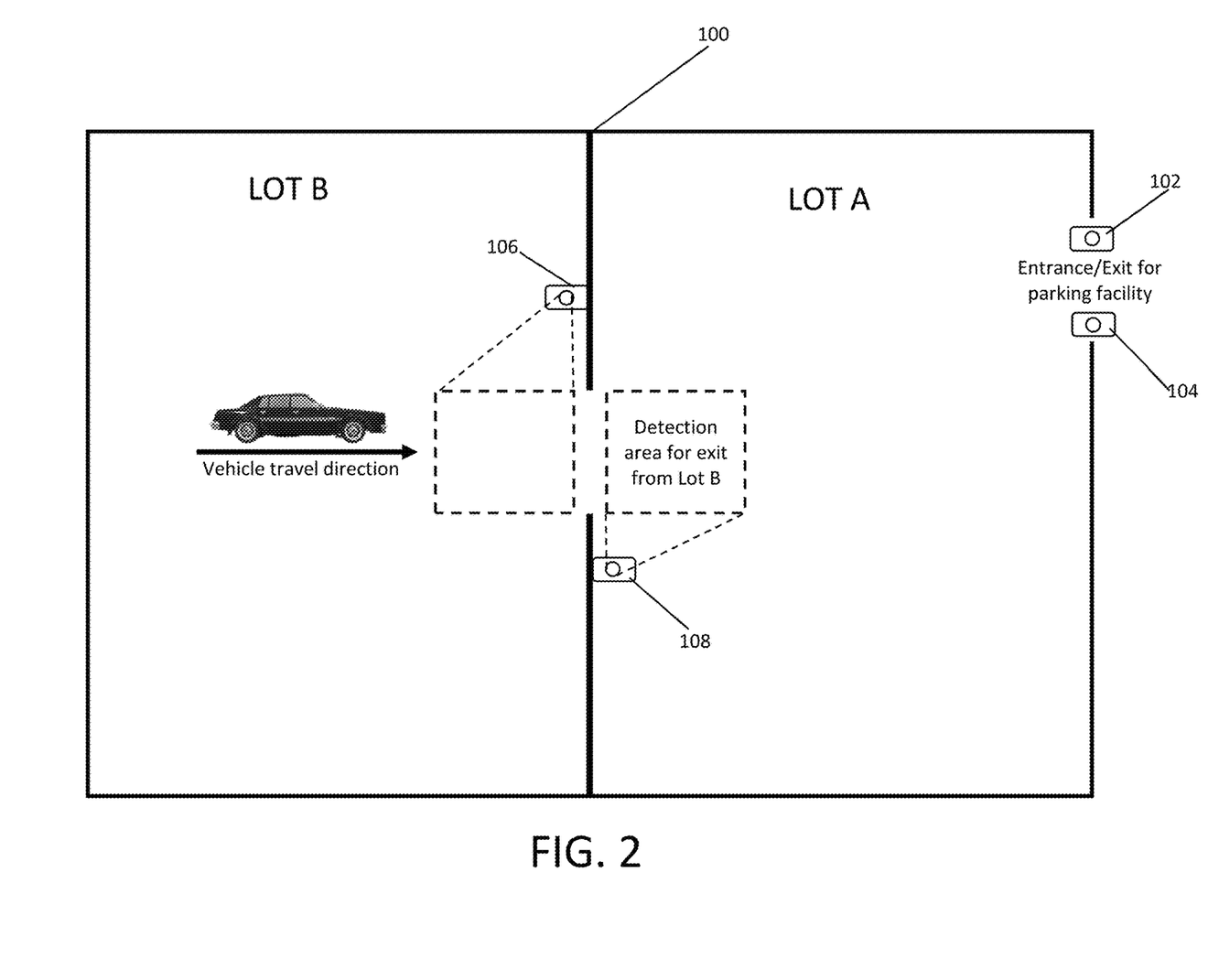
FIG. 2 is a plan view diagram of a parking facility according to certain embodiments of the invention.

Referring now to FIG. 2, the vehicle is traveling in the opposite direction as compared to FIG. 1. This may be due to the vehicle intending to exit the parking facility. In FIG. 2, camera 108 reads the license plates of a vehicle exiting LOT B and entering LOT A. When the vehicle's plate is read by camera 108, the vehicle's location status of LOT B is updated to be LOT A. This reverse direction camera configuration is replicated for any subsequent lot that has different parking rules that would be applied to vehicles in that lot versus a preceding lot.

The internal lot monitoring cameras 106 and 108 are preferably positioned to read the vehicles as they exit a preceding lot since such position allows the reading of license plates on the rear of a vehicle. Some states do not require front license plates, so reading of the rear plate is thus favored. The need for separate entrance cameras at each different lot within the parking facility is eliminated because the parking monitoring system determines that the vehicle entered a subsequent lot as it is read to be exiting the preceding lot.

The cameras 102, 104, 106 and 108 employed in the parking facility can be used to read other characteristics of vehicles in the alternative to, or in addition to, the license plate characters. For example, these cameras provide an image feed that can be processed by a networked computer to determine vehicle shape, size, color, direction of travel, etc., and combinations of the above, as a form of descriptive credentialing/identification. Near-field communication devices can also be read in further embodiments. Radio frequency identification (RFID) tags on vehicles can also be read.

In addition, a time stamp for each camera's license plate reading (or other vehicle identification reading) can be stored in a memory of the central computer system.

A detection methodology utilizing machine vision can be employed by one or more of the cameras 102, 104, 105, 108 to detect the presence of vehicles such as disclosed in U.S. Pat. No. 11,164,452. U.S. Pat. No. 11,164,452 is hereby incorporated herein by reference in its entirety.

Figure 3:
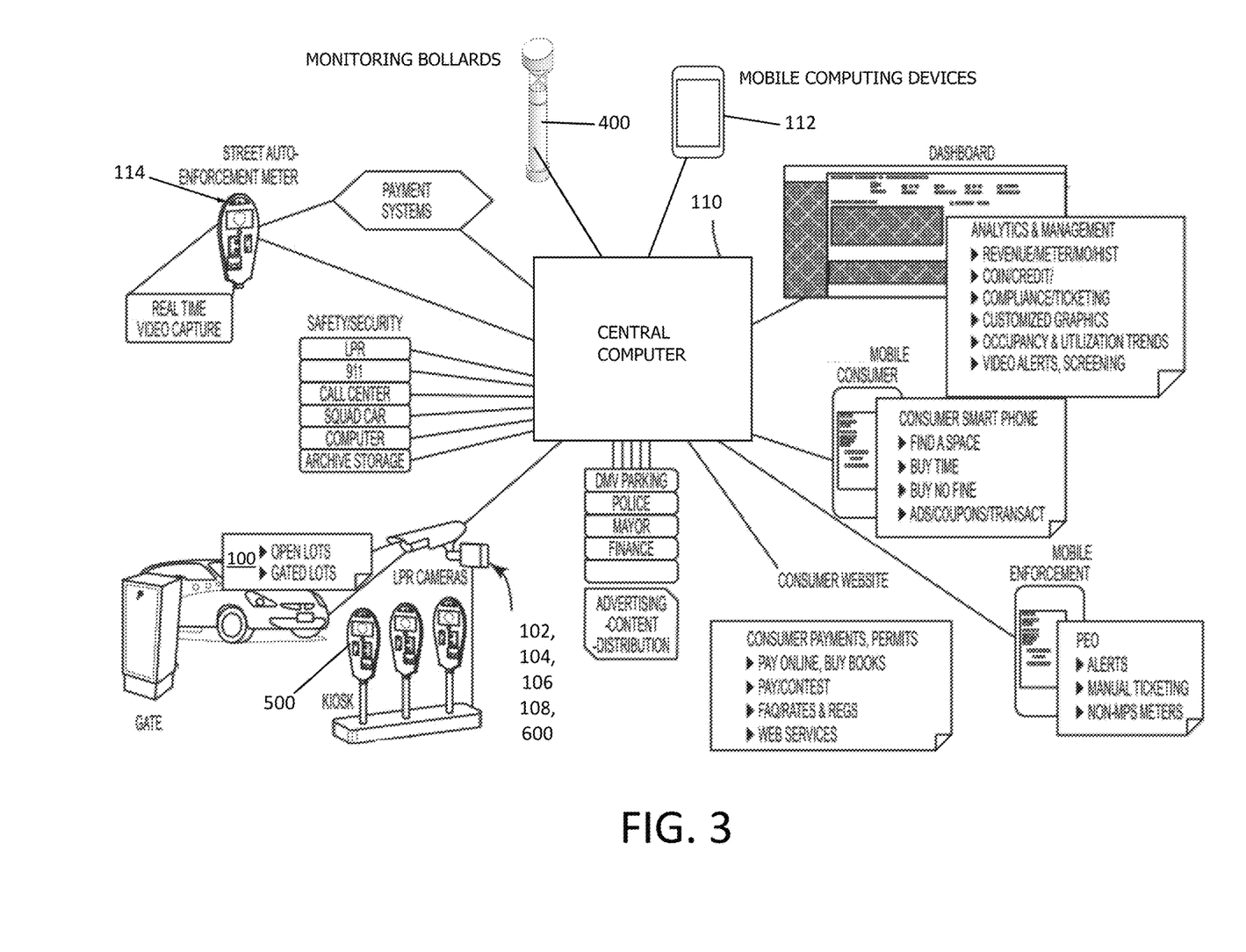
FIG. 3 is a diagram of networked parking management system components to certain embodiments of the invention.

Referring now to FIG. 3, a diagram of an integrated parking system is shown. A variety of devices are networked with the central computer 110, including the entrance camera 102, exit camera 104, the internal lot monitor cameras 106, 108, as well as a variety of additional devices that are part of an integrated parking management system, including user mobile computing devices 112, parking meters 114, vehicle monitoring bollards 400, parking kiosks 500 and additional monitoring cameras 600. Users can pay for their parking via an app executing on their mobile computing devices that are networked with the central control computer. The entirety of U.S. Pat. No. 11,574,507 B2 is hereby incorporated herein by reference in its entirety.

The central control computer 110 can be one or more remotely-located servers that are part of a "cloud" system. The central control computer 110 can also be located local to the parking facility including onsite at the parking facility in alternative embodiments. The central control computer 110 manages each parking session occurring in the parking facility 100. The central computer 110 includes microprocessors, memory and computer code that enable the parking facility management system to operate the cameras and perform all of the steps of the parking methods disclosed herein.

Additional details of parking session monitoring and management are disclosed in published U.S. Patent Publication No. US 2023/0082134 A1, which is hereby incorporated herein by reference in its entirety.

A computer readable program code can be stored in the physical memory (e.g., random access memory, flash memory or hard-drive) of the cameras 102, 104, 106, 108 and/or central control computer 110. The computer readable program code is configured such that when executed by the microprocessor(s), the code causes the cameras and/or central control computer to perform the steps of the invention described herein.

In one example use, a vehicle enters LOT A via the entrance to the parking facility 100. The entrance camera 102 reads the license plate information for the vehicle as it enters. Image data is sent to and stored by the central computer 110, including a time of entry for the vehicle. In this example, LOT A is reserved for monthly parking pass holders. The vehicle is not a parking pass holder so it must continue on to LOT B (where open parking is allowed) or a parking violation will be levied. The parking management system knows that the vehicle is not a monthly parking pass holder because the vehicle's license plate is compared against a database of pass holder registered vehicles upon entry (or later timeframe) to the parking facility. Thus, it is expected that the vehicle will exit LOT A within a preset period of time (e.g. a "dwell time" of 1 minute). If the vehicle does not exit LOT A within the preset dwell time, then a parking violation condition is flagged by the parking management system. A violation can be electronically generated and sent to the vehicle's registered owner, or a parking enforcement person can be notified and a physical violation notice issued.

In a variation of the above example, the parking management system would also know if the vehicle exited LOT A in a timely manner, but then subsequently re-entered LOT A without exiting the parking facility through the exit in less than the preset dwell time. In such case, a violation occurs and a notice can be issued accordingly.

In a further example, if the vehicle is determined to be registered to a monthly pass holder upon entering the parking facility, the vehicle will be expected to park in the lot that is designated for monthly pass holders (e.g. LOT A). However, if the operator of the vehicle instead parks in the open lot (LOT B) for whatever reason, then hourly parking charges can be levied for the duration of time that the vehicle remains in the open lot (LOT B). Of course, a grace period (e.g. five minutes) can be provided for the vehicle's operator to quickly return to LOT A so that hourly parking charges would be avoided.

In a further example, LOT A could be designated for short term parking only (e.g. less than one hour) while LOT B is for any parking duration longer than that. Different pricing schemes may be applied to short term parking versus the non-short term parking. Because the parking management system (central control computer 110 and the networked cameras 102, 104, 106 and 108) knows the exact lot or area where each vehicle in the facility is located, application of specific parking rules for each lot can be applied to each vehicle.

In yet another example, vehicles of certain types can be classified for parking in certain permitted lots or monitored areas. For example, LOT A could be reserved for electric vehicles, while LOT B is open parking for all other vehicle types. This is desirable because electric vehicle charging devices can be provided in LOT A. It is inefficient and frustrating if non-electric vehicles park in the spaces where electric vehicles can charge. Thus, the characteristics (e.g. vehicle power type) can be determined for each vehicle entering the parking facility 100. This can be accomplished by a shape recognition or other (make, model, year, and/or color) analysis performed on the images generated by the cameras, or the vehicle's license plate can be recognized as that belonging to an electric vehicle, or the vehicle may be provided with an RFID tag, QR code sticker or some other machine-readable identification means. In this example, a violation notice can be issued if a non-electric vehicle remains in LOT A for longer than the permitted dwell time for exiting LOT A and entering the open parking LOT B.

In further examples, more than one parking rule can be applied for each parking lot in a given facility.

Figure 4:
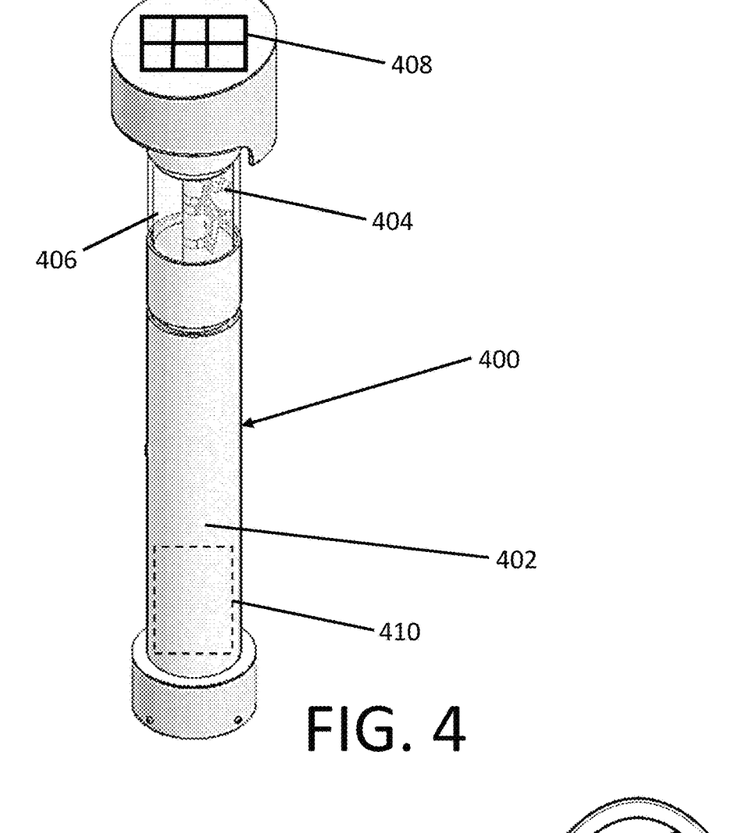
FIG. 4 is a perspective view of a camera bollard for a parking facility system according to certain example embodiments.

Referring to FIG. 4, any one or more of the cameras 102, 104, 106, 108 can be configured as a bollard 400. The bollard 400 can be mounted or secured adjacent to a location that the vehicles will pass so that the camera will have an unobstructed view of the vehicle license plates. In one example, the bollard 400 comprises a weather-resistant outer enclosure 402 with one or more cameras 404 and other electrical components, such as the microprocessor and memory disposed inside of the enclosure 402. A portion of the enclosure 402 can be transparent (or semi-transparent) which defines a window 406 so that the camera(s) 404 can see the license plates of vehicles passing by the bollard 400.

One or more vehicle sensors can also be located inside of, or on the exterior of, the enclosure 402. A solar panel 408 can be provided atop the enclosure 402 to generate some or all of the power necessary to operate the camera(s) 404 and other components of the bollard 400. A battery 410 can also be disposed inside of the enclosure 402 to store energy generated by the solar panel 408 and to power the camera(s) 404 and other components of the bollard 400. In some embodiments the bollard 400 does not need to be connected to the power grid because the solar panel 408 and onboard battery 410 are sufficient to supply all power needs. The bollard 400 is networked with the central control computer 110 via wires or wirelessly. A wireless transceiver can be included inside of the housing 402 to enable the wireless networking.

Figure 5:
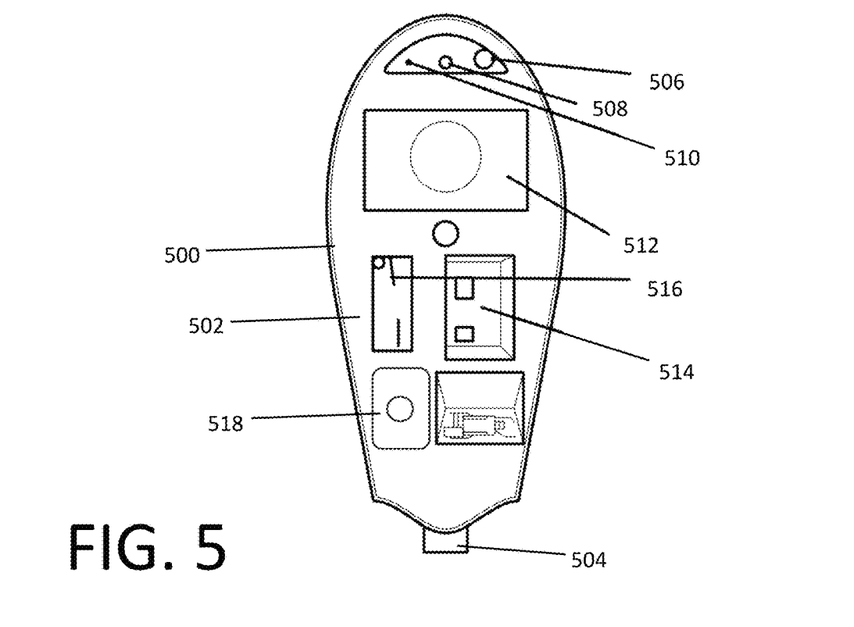
FIG. 5 is a front view of a kiosk for a parking facility according to certain example embodiments.

Referring to FIG. 5, an example kiosk 500 is shown. The kiosk 500 comprises an enclosure or housing 502 mounted atop a pole 504. The housing 502 includes the electronics for controlling operation of the kiosk and for networking the kiosk 500 with a central control computer system 110, including a microprocessor and memory. The housing 502 includes a speaker 506, a user-facing camera 508 and microphone 510 disposed adjacent to the graphical user interface (e.g., touch screen) 512. A payment acceptance means 514 and coin slot 516 are also provided. The payment acceptance means 514 can be a contactless or conventional card reader, or other known means for accepting payment. One or more cameras 518 are disposed inside of the housing 502 such that they can see the license plates of vehicles passing by the kiosk 500. A vehicle sensor can also be provided to the kiosk 500. Any one or more of the cameras 102, 104, 106, 108 can be configured as a kiosk 500.

Figure 6:
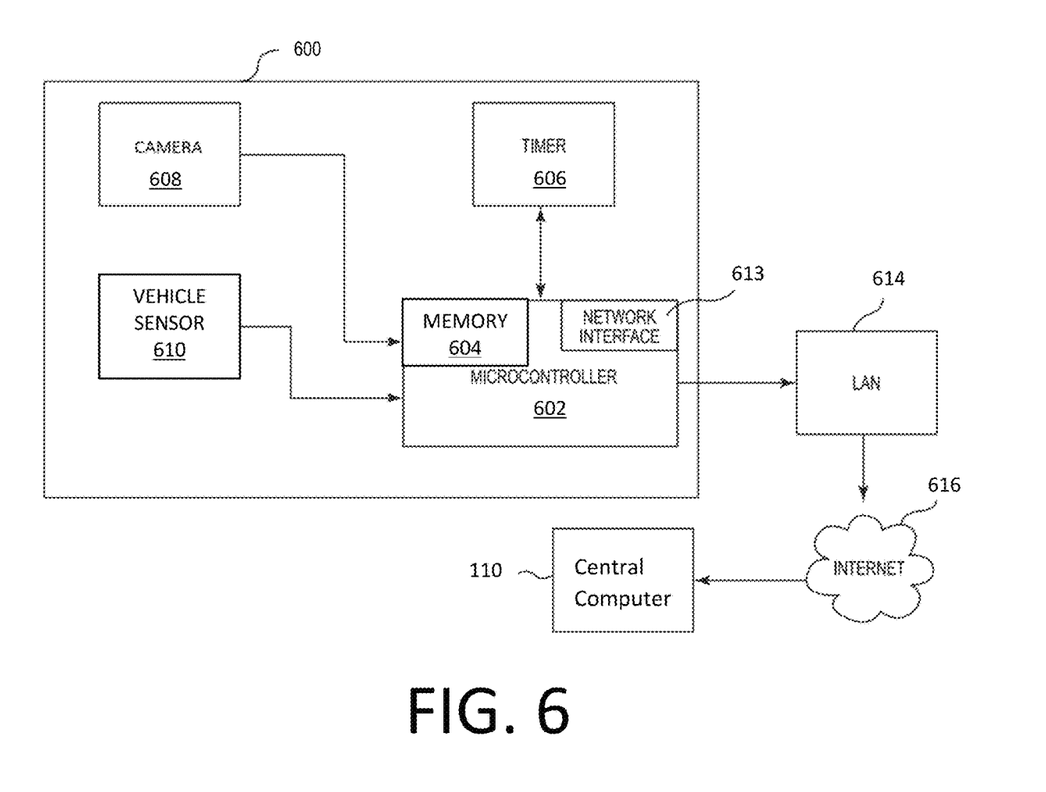
FIG. 6 is a block diagram of certain components of a parking system according to certain example embodiments.

Referring to FIG. 6, a block diagram for certain embodiments of the present parking system is provided. The camera device 600 refers hereinafter to any of the entrance/exit cameras 102, 104 and/or the internal lot monitoring cameras 106, 108. Camera 600 includes a microcontroller 602, or microprocessor, with associated physical memory 604. The software code controlling the operation and function of the camera device 600 is stored in the memory 604 and executed by the microcontroller 602. The memory 604 may include one or more non-volatile storage devices and/or one or more volatile storage devices (e.g., random access memory (RAM)).

Computer readable program code is stored in the memory 604, such as, but not limited to magnetic media (e.g., a hard disk), optical media (e.g., an OVO), solid state memory, memory devices (e.g., random access memory, flash memory), etc. The computer readable program code is configured such that when executed by the microcontroller 602, the program code causes the camera device 600 to perform the functions and steps described herein. In other embodiments, the camera device 600 is configured to perform steps and functions described herein without the need for program code.

A timer 606 can be coupled with and controlled by the microcontroller 602. The microcontroller 602 can also count processor clock cycles as a form of timer. The camera 608 (or multiple cameras) is/are coupled with and in two-way communication with the microcontroller 608. If provided, the vehicle sensor 610 is also operatively connected to the microcontroller 602.

Each camera device 600 is networked with the central or control computer 110. The camera device 600 includes a network interface 613 either integrated into the microcontroller 602, or as a separate component to enable the networking. The network interface 613 is configured to enable communication with a communication network (e.g., a local area network (LAN 614), the Internet or World Wide Web), using a wired and/or wireless connection. Network communication means include, but are not limited to, Wi-Fi, Bluetooth, cellular (HSPA, LTE, GSM, CDMA), DSL, cable, etc. The LAN 614 may include other camera devices and any kiosk(s), all in communication with one another at a given parking facility. In LAN configuration, the LAN 614 can be connected to the Internet 616 as illustrated in FIG. 6, so that communications with the cloud-based or central control computer system 110 can be accomplished.

The cloud, central or central computer system 110 (hereinafter the central computer) governs the operation of and/or stores the data from a given number of networked camera devices 600 and kiosks 500. The central computer 110 may comprise one or more servers interfacing with networked storage in a data center. The central computer 110 is located remotely in a secure location for convenience and security purposes (or can be local or onsite at the facility). The LAN 614, in turn, is connected to the World Wide Web (i.e. Internet) in order to be in communication with a variety of other computing systems, including law enforcement, operations companies, user mobile devices, user web interfaces and security services, etc. such as indicated in FIG. 3. This way, the data collected by the cameras 600 and inputted into the overall integrated parking management system by administrators, users and others can be securely stored and reviewed by appropriate authorities and the operations of all camera devices 600 in a given parking system can be monitored and remotely controlled via the central computer 110.

The LPR function can be performed onboard the camera devices 600 by the microcontroller 602 using LPR software stored in the memory 604. The LPR function can also be performed by a remotely-located computer system, such as the central computer 110. In such embodiment, the central computer 110 performs the character recognition on image data provided by the networked camera device 600.

A decoder can also be included in the camera device to decode an identification where the license plate (or other part of the vehicle) is equipped with a radiofrequency identification (RFID) tag. In addition, the camera device 600 can be programmed to decode machine-readable glyphs and visual encodings, such as barcodes and matrix barcodes (e.g., QR codes), in order to read such encoded items on the vehicle's plate or other portion of the vehicle. Multiple decoding/reading means can be included in a given camera device 600 (or multiple separate devices can be provided) to allow the parking system to adapt to a variety of identification methodologies.

Figure 7:
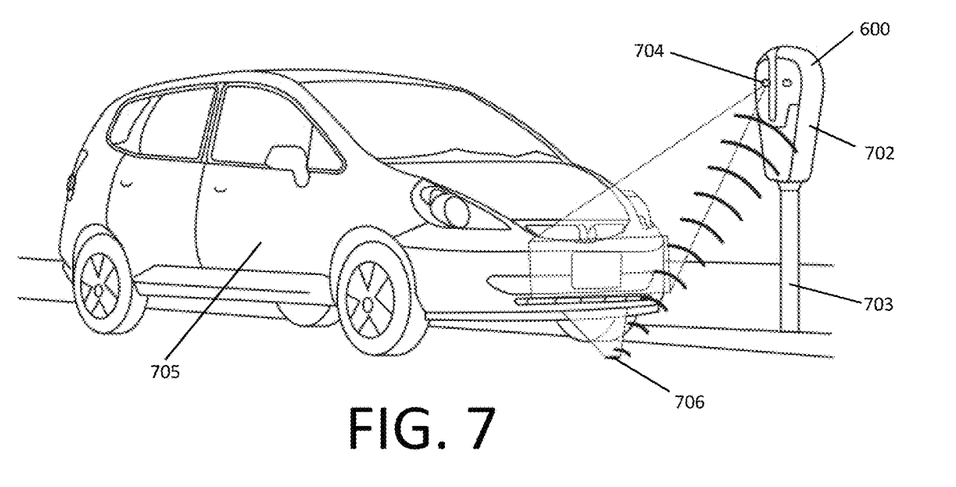
FIG. 7 is a diagram of a vehicle license plate being read by a camera as the vehicle passes by the camera device according to certain example embodiments.

Referring to FIG. 7, the camera device 600 is enclosed in a camera housing 702 that can be placed adjacent to the entrance or exit of the parking facility 100, in individual lots within the parking facility 100, or in any other desired location. The camera housing 702 can be disposed atop a pole 703 that is secured to the ground. The camera housing 702 can be configured as a bollard (e.g., FIG. 4), kiosk (e.g., FIG. 5) or other suitable configuration in other embodiments.

One or more individual cameras 704 can be disposed inside of the housing 702. The camera(s) 704 view outward through a window in the housing 702 or directly from the housing 702. The camera(s) 704 can also be mounted external to the housing 702. The camera(s) 704 can also be mounted on a pole separate from the housing 702 as a further alternative.

Also enclosed with the housing 702 are microprocessor(s), memory and computer code that enable the camera(s) 600 to read the license plates of vehicles 705 entering/exiting the parking facility 100 and/or passing through the lots in the parking facility, as well as obtain still images and/or video of the vehicles 705.

In certain embodiments, a vehicle sensor 706 can be embedded in the ground below, on the pole 703, in the housing 702, or somewhere adjacent to, the vehicle 705. The vehicle sensor 706, such as a magnetic sensor, a radar sensor, sonic sensor or laser sensor, can be used to detect the presence of a vehicle to serve as a double-check on a vehicle detection function of the camera device 600, or it can serve as a low-power sensor to wake up the camera device 600 from a dormant or power-conserving state. The vehicle sensor 706 can also be a second camera.

The vehicle sensor 706 broadcasts a status message or output value to the nearby camera device 600 as shown in FIG. 7. The broadcast can be performed using low power Bluetooth or other short range wireless communications protocol. The broadcast frequency can be continuous or periodic. For example, the status of the vehicle sensor 706 can be broadcast once per second, ten times per second, etc.

In one preferred embodiment, the vehicle sensor 706 is powered by an internal lithium-based battery and a sensing/broadcast cycle is performed once per second in order to conserve battery life. A sensor life expectancy of several years can be achieved using such battery and operating method. In other embodiments, the sensor 706 can be hard-wired for power and/or broadcast.

In embodiments where the vehicle sensor 706 is integrated into, or located adjacent to, the camera device 600, the sensor 706 can be coupled to the camera 600 via internal wires (if internal) or via an electrical conduit (if external). The conduit can carry both power and data bi-directionally, or separate power and data conduits can be provided. More than one vehicle sensor 706 can also be employed.

The camera or cameras 604 disposed in the camera device 600 (or remotely from the housing 602 as discussed above) use image sensors (e.g., ccd or cmos) and can apply a machine vision technique such as background subtraction and/or edge detection to determine whether a vehicle 105 is passing into or out of a given lot or the parking facility. Note that the background subtraction methodology can also be referred to as foreground subtraction and foreground detection. Edge detection, or other suitable optical sensing means, can be employed in other embodiments. A combination of detection methodologies can also be combined or used as a double-check on the other.

Figure 8:
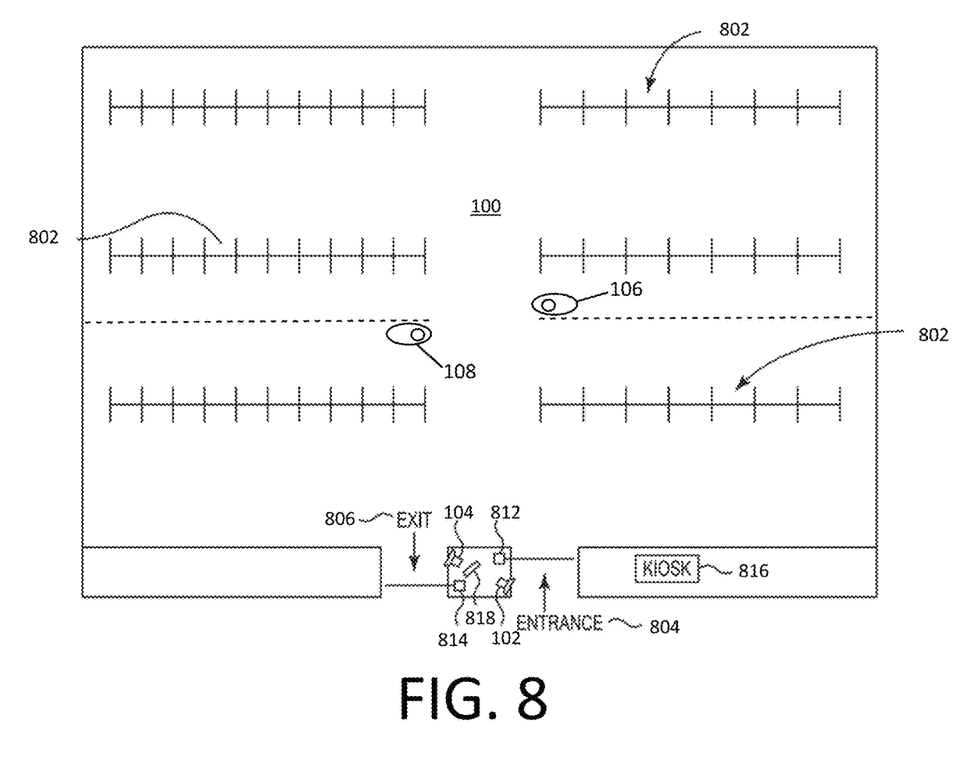
FIG. 8 is a diagram of a parking facility according to certain example embodiments.

Referring now to FIG. 8, an example of an automated parking facility 100 such as a parking lot or parking ramp will be described. The description below uses the term "lot" but it should be understood that the present invention can be used for any form of parking facility.

The parking lot 100 comprises a plurality of parking spaces 802 divided into multiple sublots, LOT A and LOT B. The vehicle entrance 804 and exit 806 to the lot 100 are each monitored with a respective entrance/exit camera device 102, 104 located adjacent to the respective entrance 804 and exit 806. Vehicles passing from Lot A to Lot B (and vice versa) are monitored by lot cameras 106 and 108 as discussed previously. Of course, there can be multiple entry/exit points and further sublots, each with a corresponding camera device. Each camera device 102, 104, 106, 108 reads the vehicle identification (ID) (e.g., license plate numbers/letters or other characters) of every vehicle entering or exiting the parking lot 100. The decoded vehicle ID is then transmitted and/or stored in memory as described herein. Additional vehicle characteristics can be read as discussed previously.

A gate 812 can be optionally provided to the entrance, and a corresponding gate 814 to the exit, to bar passage of a vehicle for various reasons, such as when the lot has reached capacity, or any time a vehicle is not permitted in the lot, or to cause a violator to pay a fine prior to exiting. Gates can also be provided between sublots.

One or more kiosks 816 can be provided to the parking facility 100 in a location convenient to persons parking in the facility 100. The kiosk 816 can be used to submit payments for parking time, to pay fines, to obtain/provide information, etc. In one example embodiment, a kiosk 816 can be provided at the entrance so that the user can provide their payment information upon entrance to the lot 100. The kiosk 816 can be integrated into the same housing as the camera device 102, 104 as well. The kiosk 816 can be communicatively coupled (e.g., networked) to the camera device(s) 102, 104, 108, etc. as part of an integrated parking system as described herein.

In locations where vehicles have only rear license plates, the entrance 804 or exit 806 are correspondingly configured so that the camera devices 102, 104, 108 are placed and aimed so that the rear license plate can be effectively read. Multiple cameras can also be provided (either in a single housing or in separate housings) at a given location to capture and read both the front and rear license plates of each vehicle passing by. A message board 818 can also be provided at the entrance and/or exit of the lot 100 to provide information to users, such occupancy status, pricing information and other messages.

Figure 9:
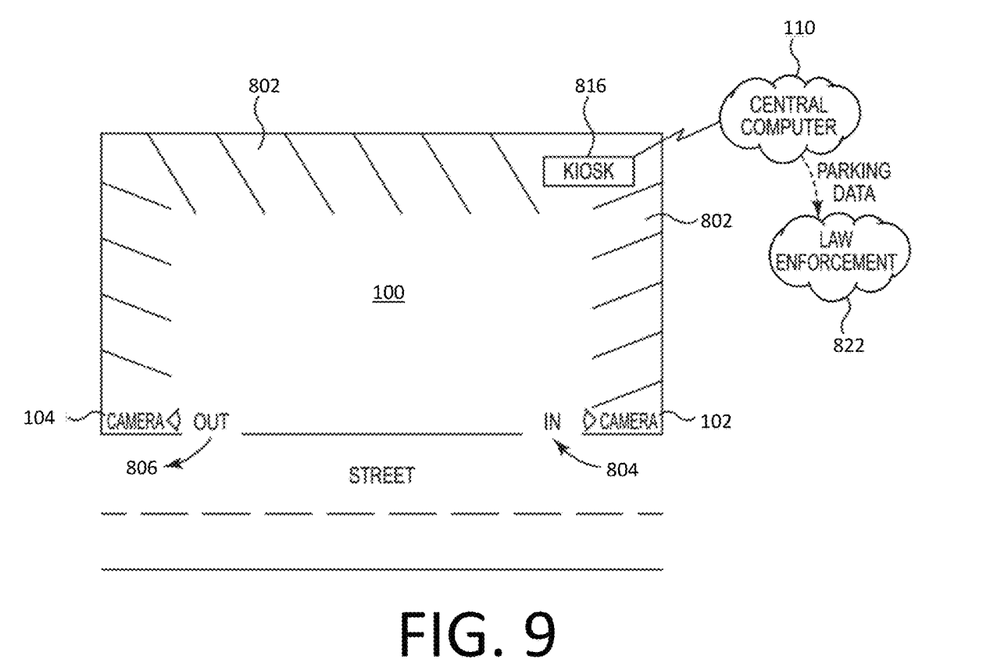
FIG. 9 is a diagram of a parking facility system according to certain example embodiments.

The electromechanical gates 812, 814 can be eliminated, if desired. Such gates are costly and can fail. Referring to FIG. 9, a gateless parking facility 100 configuration is depicted. In this example, the parking lot 100 is shown with one entrance 804, one exit 806 and one sublot for simplicity of explanation, but multiples of each can be provided. Camera devices 102, 104 are placed at the respective entrance 804 and exit 806 of the parking lot 100. A kiosk 816 is also provided to the lot 100. The camera devices 102, 104 are networked with the central computer 110 to report all vehicle data and image data.

The image data from the camera devices 102, 104, 106 and 108 can also be automatically relayed to law enforcement systems 822. This allows law enforcement agencies to perform real-time monitoring of who/what is parked where, to compare vehicle ID's (e.g., plates) against a stolen car database, or compare ID data against a person of interest database, or other analysis related to public safety and security. Such processes can be used by law enforcement for monitoring/investigation of Amber alerts, stolen vehicles, scofflaws, felons and crime prevention, among other security related applications. This law-enforcement coupling embodiment could greatly reduce crime and increase the productivity of law enforcement agencies locally, regionally and nationwide. It would be a unique addition to the intelligence gathering done by police today, and an incremental benefit to the communities served.

Figure 10:
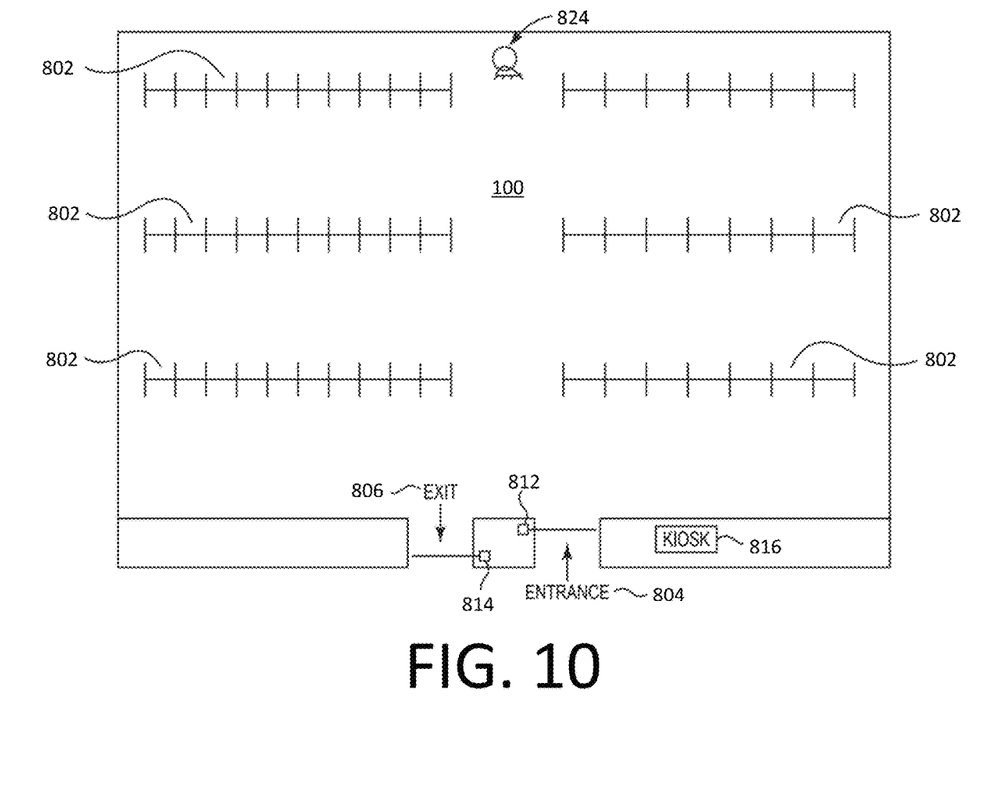
FIG. 10 is a diagram of a parking facility according to certain example embodiments.

In FIG. 10, the separate entrance/exit camera devices 102, 104 are replaced with a single camera device 824 mounted at an elevated position above the parking facility 100. The elevated position can be, for example, at the top of a pole in a position that the camera device 824 can see the entrance 804 and exit 806 simultaneously within the camera's fixed field of view. The elevated position allows the camera device 824 to read the license plates of all cars entering and exiting the parking lot 100 as well as determining which sublot in which each vehicle parked. A visual marker line 805 demarks the division between lots A and B rather than a physical barrier in this embodiment. However, physical barriers, such as curbing, can instead be provided.

The single camera embodiment reduces the equipment costs and places the camera device 824 in a location with lower likelihood of damage due to vandalism. The camera device 824 can also be equipped with motors to selectively adjust rotation angle (azimuth) and elevation angle. The lens of the camera device 824 can also be equipped with zoom capability.

Figure 11:
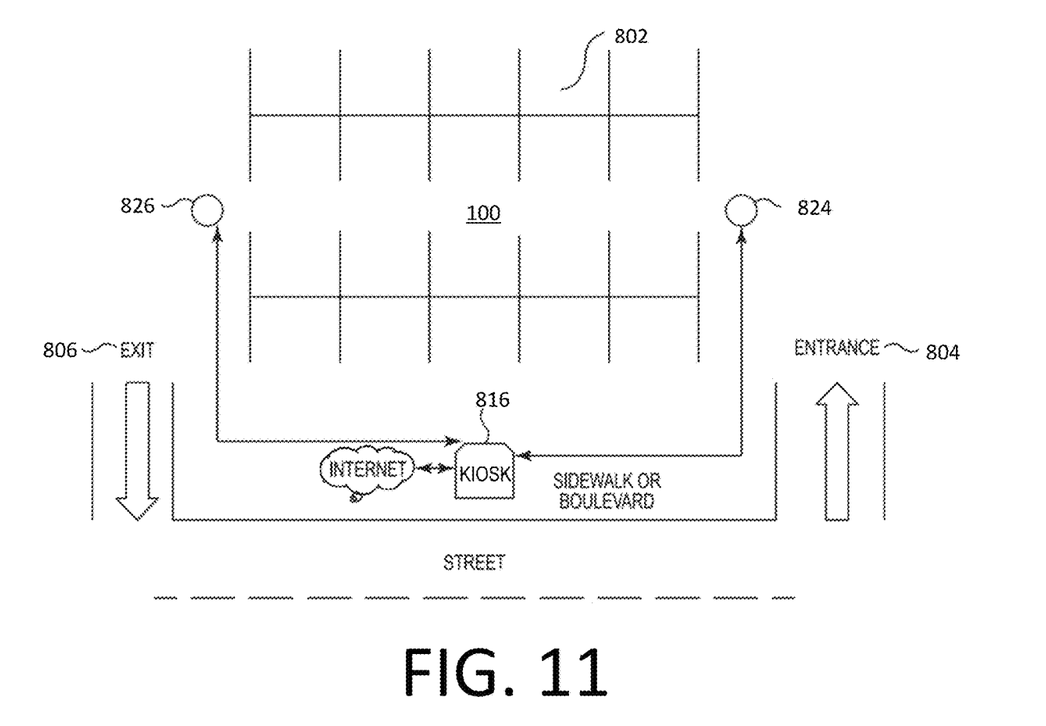
FIG. 11 is a diagram of a parking facility according to certain example embodiments.

Additional entrances/exits 804, 806 and sublots can be monitored with the same single camera device 824, if they are in that camera's effective field of view. If not in the field of view, then one or more additional elevated camera devices 826 can be utilized as shown in the alternative configuration of FIG. 11. A combination of camera devices 102, 104 at entrance/exit and elevated positions 824, 826 can also be used in further embodiments. Control gates 812 and 814 at the entrance 804 and exit 806 can be provided as an option.

Additional methods and functionality of the parking systems disclosed in U.S. Pat. Nos. 9,870,648 B2, 10,121,172 B2, and 11,164,452 B2 can be provided to the present system in additional embodiments hereof. Each of U.S. Pat. Nos. 10,121,172 B2, 11,164,452 B2 and 9,870,648 B2 are hereby incorporated herein in their entirety.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An automated parking system for a parking facility comprising a first sublot, a second sublot, an entrance and an exit, the automated parking system comprising:
   a first camera disposed adjacent to the entrance of the parking facility;
   a second camera disposed adjacent to the exit of the parking facility;
   a third camera disposed in the parking facility such that the third camera can image vehicles exiting the first sublot and entering the second sublot; and
   a central computer located remote from the parking facility, the central computer networked with the first camera, the second camera and the third camera,
   wherein the first camera is configured to image a vehicle identification characteristic of a vehicle entering the parking facility and transmit the vehicle identification characteristic to the central computer,
   wherein the second camera is configured to image the vehicle identification characteristic of the vehicle exiting the parking facility and transmit the vehicle identification characteristic to the central computer, and
   wherein the third camera is configured to image the vehicle identification characteristic of the vehicle exiting the first sublot and entering the second sublot and transmit the vehicle identification characteristic to the central computer.

2. The automated parking system of claim 1, further comprising a fourth camera disposed in the parking facility such that the fourth camera can image vehicles exiting the second sublot and entering the first sublot, wherein the fourth camera is configured to image the vehicle identification characteristic of the vehicle exiting the second sublot and entering the first sublot and transmit the vehicle identification characteristic to the central computer.

3. The automated parking system of claim 1, wherein the central control computer is configured to determine an identification of the vehicle from the vehicle identification characteristic.

4. The automated parking system of claim 1, wherein the vehicle identification characteristic is one or more license plate characters.

5. The automated parking system of claim 1, wherein the vehicle identification characteristic is at least one of a vehicle type, a vehicle make, a vehicle model, a vehicle year and a vehicle color.

6. The automated parking system of claim 1, wherein the central computer comprises a parking permit database to store vehicle identifications for vehicles with permits for parking in the parking facility.

7. The automated parking system of claim 6, wherein the central computer is configured to compare the vehicle identification of the vehicle exiting the first sublot and entering the second sublot to the stored vehicle identifications in the parking permit database to determine whether there is a match.

8. The automated parking system of claim 7, wherein when the second sublot is reserved for parking permit holders, wherein the vehicle exiting the first sublot and entering the second sublot dwells for more than a preset period of time in the second sublot, and wherein when the central computer determines that there is no match of the vehicle identification of the vehicle entering the parking facility to the stored vehicle identifications in the parking permit database, the central computer is further configured to issue a parking violation notice to said vehicle.

9. The automated parking system of claim 7, wherein when the second sublot is reserved for parking permit holders, and wherein when the central computer determines that there is a match of the vehicle identification of the vehicle exiting the first sublot and entering the second sublot to the stored vehicle identifications in the parking permit database, the central computer does not calculate an hourly charge for parking by the vehicle.

10. The automated parking system of claim 1, wherein each of the first camera, second camera and third camera are license plate reading (LPR) cameras.

11. The automated parking system of claim 1, wherein a parking rule for the first sublot is different than for the second sublot.

12. The automated parking system of claim 1, wherein a parking price for the first sublot is different than for the second sublot.

13. The automated parking system of claim 1, wherein the first sublot is reserved for permit holders and the second sublot is for open hourly parking.

14. A method of automatically monitoring of a vehicle in a parking facility comprising a first sublot and a second sublot, the method comprising:
capturing a vehicle identification with a first lot camera as the vehicle exits the first sublot and enters the second sublot;
storing the vehicle identification captured by the first lot camera in a database of a central computer system that is located remote from the parking facility;
capturing a vehicle identification with a second lot camera as the vehicle exits the second sublot and enters the first sublot; and
storing the vehicle identification captured by the second lot camera in a database of the central computer system.

15. The method of claim 14, further comprising:
capturing a vehicle identification with an entrance camera as the vehicle passes through an entrance to the parking facility; and
capturing a vehicle identification with an exit camera as the vehicle passes through an exit to the parking facility.

16. The method of claim 14, further comprising timing a grace period beginning when the vehicle exits the first sublot and enters the second sublot.

17. The method of claim 14, further comprising applying a different parking rule to a vehicle in the second sublot compared to the first sublot.

18. The method of claim 14, further comprising determining by the central computer whether the vehicle exiting the first sublot and entering the second sublot is listed in a database of permit holders.

19. The method of claim 14, wherein one of the first or second sublots is reserved for parking permit holders, the method further comprising, the central computer system automatically issuing a violation notice to a vehicle when the vehicle remains in the sublot reserved for permit holders for more than a predetermined period of time.

20. The method of claim 14, wherein capturing the vehicle identification includes performing a license plate reading of a license plate of the vehicle.

* * * * *